UNITED STATES PATENT OFFICE.

EMILE SALVY, OF PARIS, FRANCE.

PREPARATION OF GELATINE FOR VITRIFIABLE PRINTS.

SPECIFICATION forming part of Letters Patent No. 223,762, dated January 20, 1880.

Application filed March 5, 1879.

*To all whom it may concern:*

Be it known that I, EMILE SALVY, of 1 Rue Laffitte, Paris, France, have invented certain new and useful Improvements in the Preparation of Gelatine with the view of its subsequent vitrification, for which invention I have made application for patent in France on the 7th of January, 1879; and I do hereby declare that the following is a full, clear, and exact description thereof, which will enable those skilled in the art to which it appertains to employ the said process of preparation.

The object of this invention is to prepare the gelatine, before it is subjected to the process proper of vitrification, in such manner that the vitrification can take place without causing any swelling, blistering, and tearing of the mass, as is usually the case if the gelatine has not previously been treated according to my invention.

To obtain these results vitrifiable oxides are used for the coloring of the gelatine, and then the mass, after it is brought into the desired shape, is plunged or dipped into a certain solution, which modifies its nature in such manner that the above-mentioned objectionable consequences of the process of vitrification are entirely avoided.

If this process of preparation is employed for gelatinous prints, these, if obtained by a photographic process, may be either printed on paper, from which they can be transferred, or they may be directly printed on glass. The same methods can be employed for prints obtained from copper or steel plates.

My process can be employed not only on glass, but also for the ornamentation of crystal-glass, porcelain, stoneware, and enamel.

Method of operation: I will describe my improved process as employed for the production and preparation of gelatinous prints; but it is evident that it can be used with the same results for treating and preparing for subsequent vitrification gelatine in any other shape and for any other desired purpose. I dissolve in an ordinary water-bath ten grams of gelatine in one hundred grams of water, and then color this liquid by means of a metallic oxide, to which I add a quantity of flux. This mixture is poured in a thick layer on unsized paper, and then, after it is dried, made sensible to the action of the light by means of a bath of bichromate, and finally treated in the manner of what are commonly called "crayon prints;" or the liquid may be poured in a mold or over an engraved plate, and, by a special press, drawn directly on glass or simply on paper, from which it can be transferred. Whatever may be the method employed in this first operation, the gelatinous print, whether it be direct or transferred after it is perfectly dried, is for a quarter of an hour dipped into one of the following solutions: First, water, one hundred grams; permanganate of potash, four grams. Second, water, one hundred grams; sulphate of aluminia, four grams; nitrate of potash, four grams. Third, water, one hundred grams; tan, two grams; nitrate of potash, four grams. Fourth, water, one hundred grams; gallic acid, two grams; nitrate of potash, four grams. Fifth, water, one hundred grams; chrome-alum, four grams; nitrate of potash, four grams.

I do not, however, confine myself to the above-mentioned solutions, as all substances which have the property of making gelatine insoluble produce the same effect when they are mixed with nitrate of potash.

After being immersed for a quarter of an hour in one of these baths the print is carefully washed in clear water, and then left to dry spontaneously. Finally, it is covered with a thin layer of flux, and in this state it is ready to be baked in a suitable oven.

I claim as my invention—

The described method of coloring and of preventing the swelling, blistering, or tearing of the gelatine before subjecting it to the process of vitrification, the same consisting in coloring the gelatine with vitrifiable oxides, and then treating it with a solution of permanganate or of nitrate of potash, or its equivalent, mixed with a substance adapted for rendering the gelatine insoluble, such as chrome-alum, gallic acid, or tannin, substantially as and for the purposes specified.

In witness whereof I have hereunto set my hand this 29th day of January, 1879, in the presence of two subscribing witnesses.

E. SALVY.

Witnesses:
ROBT. M. HOOPER,
A. RÉE.